3,096,170
NOVEL SLURRY FERTILIZER

William S. Newsom, Jr., Lakeland, Fla., assignor to International Minerals & Chemical Corporation, a corporation of New York
No Drawing. Filed Oct. 2, 1958, Ser. No. 764,762
10 Claims. (Cl. 71—64)

This invention relates to a novel fertilizer in aqueous slurry form. More particularly this invention relates to the use of novel additives to inhibit the formation of large crystals and to inhibit settling of solids contained in aqueous slurries of fertilizer materials.

At the present time, liquid mixed fertilizer is a rapidly expanding phase of the fertilizer industry. Liquid mixed fertilizers are substantially neutral aqueous solutions containing at least two of the three major plant nutrients, viz., N, $P_2O_5$, and $K_2O$, dissolved therein. In the article entitled "Formulating Liquid Fertilizers," by R. P. Langguth, et al., Journal of Agricultural and Food Chemistry, vol. 3, No. 8, August 1955, pages 656 to 663, it is pointed out that the proper selection of raw materials and the use of proper proportions of these materials results in a liquid fertilizer having a total nutrient content and ratios of nutrients approaching or equal to those of dry fertilizers. The grade of liquid fertilizer (i.e., percent nitrogen-percent $P_2O_5$-percent $K_2O$ by weight) may be varied over a wide range depending upon the proportions of ingredients utilized. However, in order to minimize corrosion of storage tanks and distributing apparatus, and to prevent loss of ammonia, the proportions of ingredients should be adjusted to produce a solution having a pH between about 5.8 and about 8.

Because of the solubility characteristics of the ingredients used in the preparation of liquid mixed fertilizers, it is difficult to obtain at a temperature of about 32° F. a completely liquid fertilizer containing more than about 30% by weight of plant nutrients. If the total plant nutrients exceed about 30% by weight, generally crystallization of plant nutrient salts occurs upon standing. Since such crystallization causes undesirable coating of the storage containers and clogging of the distribution lines, the total plant nutrient content of liquid fertilizers is therefore limited to a maximum of about 30% by weight. Furthermore, it is not economical to ship these dilute solutions for long distances from the plant, since the high water content of the liquid fertilizer does not always justify the transportation cost.

More recently, attempts have been made to prepare slurry fertilizers in a manner similar to that used in the preparation of liquid fertilizers, with the exception that higher concentrations of plant nutrient materials are used, and crystallization of plant nutrients is permitted. However, the slurry is treated with certain additives to inhibit the formation of large crystals and to suspend the fine crystals that form. Attapulgite, a clay mineral known as fuller's earth, mined in the vicinity of Attapulgus, Georgia, has been used as an additive for slurry fertilizers with some success. However, even when this material is added to the slurry a substantial proportion of crystals larger than about 20 mesh are formed, thereby reducing, but not eliminating, the handling and distribution problems inherent in the use of slurry fertilizers.

It is an object of the present invention to prepare a novel fertilizer material in aqueous slurry form.

It is another object of the invention to inhibit or eliminate the formation of large crystals in slurry type fertilizers.

Still another object of the invention is to inhibit the settling of fine crystals present in slurry type fertilizers.

These and other objects will become apparent from the following detailed description of the invention.

In the present invention the formation of large crystals and settling of fine crystals can be prevented in aqueous slurry type fertilizers by the addition of attapulgite and a swelling type bentonite thereto. The addition of attapulgite and bentonite in a weight ratio of between about 0.25:1 and about 4:1 is far more effective than the use of either attapulgite or bentonite alone.

Attapulgite is a clay mineral known as fuller's earth, mined in the vicinity of Attapulgus, Georgia. A representative chemical analysis of attapulgite is as follows:

REPRESENTATIVE ANALYSIS OF ATTAPULGITE

| Component: | Proportion, Percent |
|---|---|
| $SiO_2$ | 55.03 |
| $Al_2O_3$ | 10.24 |
| $Fe_2O_3$ | 3.53 |
| $MgO$ | 10.49 |
| $K_2O$ | 0.47 |
| $H_2O$ @ 150° C | 9.73 |

Any inactive colloidal swelling-type bentonite clay, such as bentonite found in the vicinity of the Black Hills of South Dakota or northeastern Wyoming can be used as a component of the novel additive for slurry fertilizers. A representative chemical analysis of a suitable swelling-type bentonite clay is as follows:

REPRESENTATIVE ANALYSIS OF BENTONITE CLAY

| Component: | Proportion, percent |
|---|---|
| $SiO_2$ | 60.64 |
| $Al_2O_3$ | 23.26 |
| $Fe_2O_3$ | 3.92 |
| $TiO_2$ | 0.12 |
| $CaO$ | 0.59 |
| $MgO$ | 2.10 |
| $K_2O$ | 0.37 |
| $Na_2O$ | 4.33 |
| $H_2O$ | 2.83 |

Attapulgite and bentonite clay are added to the liquid component of the slurry fertilizer in a weight ratio of attapulgite to bentonite clay of between about 0.25:1 and about 4:1, and preferably between about 0.5:1 and about 2:1. It is important that the ratio of attapulgite to bentonite clay be within the above-mentioned range since the addition of attapulgite alone, bentonite clay alone, or mixtures of the two in proportions which provide a weight ratio of less than 0.25:1 or greater than 4:1 does not effectively inhibit the formation of larger crystals in the slurry.

Attapulgite and bentonite clay, in the above-mentioned ratios, are added to the liquid component of the slurry fertilizer in proportions sufficient to provide between about 0.5 and about 6% by weight of the resulting slurry fertilizer. Attapulgite and bentonite clay in finely divided form are preferably premixed before adding to the liquid component, but may be added separately thereto if desired. It is preferred that the average discrete particle size of both the attapulgite and bentonite clay be less than about 0.3 micron in order to obtain the most effective suspending action and inhibition of the formation of large crystals, but solids of larger particle size may be used if desired.

Attapulgite and bentonite, if used in the above described proportions and ratios, effectively control crystallization and settling of solids in aqueous slurry fertilizers containing in excess of about 30% by weight of plant nutrients. The slurry fertilizer may contain one or more of the major plant nutrients, viz., nitrogen, phosphate, and potash.

Sources of nitrogen suitable for use in the preparation of slurry fertilizers include ammonia, urea, ammonium nitrate, ammonium sulfate, and mixtures thereof. Ammonia may be used in either aqueous or anhydrous form. Urea, ammonium nitrate, and ammonium sulfate may be used in solid form or as an aqueous slurry or solution.

Phosphatic compounds suitable for use in preparing slurry fertilizers include concentrated aqueous phosphoric acid solutions, monoammonium phosphate, diammonium phosphate, or mixtures thereof. Ammonium phosphates can be used in either solid or aqueous form. Aqueous phosphoric acid solutions having a concentration in excess of about 70% by weight of $H_3PO_4$ are preferably used, but more dilute solutions may be used if desired. Phosphoric acid prepared by either the "furnace process" or by the "wet process" can be used in the preparation of the novel slurry fertilizer composition. It is not feasible to use wet process phosphoric acid in the preparation of liquid fertilizers, because this acid contains significant proportions of iron and aluminum in solution which precipitate when the acid is ammoniated. However, this characteristic of wet process phosphoric acid is not a disadvantage when used in the preparation of slurry fertilizers, since these fertilizers contain suspended solids.

Suitable sources of potash are potassium salts such as potassium chloride, potassium sulfate, potassium nitrate, and the like.

The proportions of plant nutrient compounds used in the preparation of slurry fertilizer will vary with the grade of fertilizer desired. Slurries of mixed fertilizer materials containing plant nutrients in the proportion of 1:1:1, 1:2:1, 1:3:1, 1:3:0, 2:3:1, 4:3:1, and the like, can be prepared. Generally, the total plant nutrient content of the slurry fertilizer is in excess of about 30% by weight. If the slurry fertilizer is prepared from plant nutrient compounds in aqueous slurry or solution form, the proportion and concentrations should be adjusted so that the total water content of the resulting slurry is less than about 70% by weight.

In a preferred embodiment of the invention, attapulgite and a swelling type bentonite are admixed in a weight ratio of between about 0.25:1 and about 4:1 and slurried with water. Concentrated aqueous phosphoric acid and anhydrous ammonia are added to the slurry in proportions to provide an $H_3PO_4$ to $NH_3$ weight ratio of between about 2.8:1 and about 4.0:1, and preferably between about 2.87:1 and about 3.6:1. If the ratio is above about 4:1, the resulting slurry is very acidic and may excessively corrode storage containers and distribution lines. If the ratio is less than about 2.8:1, significant amounts of ammonia may be lost by volatilization. The reaction of phosphoric acid with ammonia is exothermic and thereby increases the temperature of the slurry to a temperature near or at the boiling point of water. Solid urea is added to the slurry to increase the proportion of nitrogen, and a potassium salt such as potassium chloride is added to the slurry to provide potash. After dissolution of plant nutrient-containing compounds in the hot aqueous slurry, the slurry is allowed to cool to ambient temperature, whereby a portion of the dissolved solids recrystallizes in finely divided form. Substantially all of the crystals pass through a 20 mesh screen, and remain suspended in the slurry.

In another embodiment of the invention, attapulgite and non-swelling type bentonite in the above-described proportions and ratios are slurried with water, and the resulting slurry is heated to a temperature near the boiling point. A mixture of monoammonium phosphate and diammonium phosphate having an $H_3PO_4$ to $NH_3$ weight ratio of between about 2.8:1 and 4.0:1, and preferably between about 2.87:1 and about 3.6:1, is dissolved in the heated slurry. A potassium salt, and a supplementary source of nitrogen, such as urea, are also dissolved in the heated slurry. The resulting slurry is cooled to ambient temperature whereby a portion of the dissolved solids recrystallizes and whereby substantially all of these crystals are in finely divided form and remain suspended in the slurry. The resulting slurry fertilizer may be stored without appreciable sedimentation of crystals, without losing an appreciable degree of homogeneity, and without the danger of crystals clogging the distribution lines.

It will be recognized by those skilled in the art that the procedure may be further modified without departing from the spirit of the invention. For example, when the aqueous slurry fertilizer is prepared by the reaction of concentrated phosphoric acid and ammonia as set forth above, it is preferred to add a thick aqueous slurry of attapulgite and bentonite after ammoniation of the phosphoric acid, since addition of clays to concentrated phosphoric acid prior to ammoniation may adversely affect the suspending properties of the clay. If desired, the resulting slurry is cooled to ambient temperature, and solid potassium salts and supplementary nitrogen containing compounds, in finely divided form, are added to the slurry. The resulting slurry fertilizer can be stored without the danger of crystallization of large solids.

In order to more fully define applicant's invention, the following example is presented without any intention to be limited thereby. All parts and percentages are by weight unless otherwise specified.

*Example*

A 12:12:12 grade of slurry fertilizer material was prepared as follows:

Attapulgite (2.0 parts) obtained from the vicinity of Attapulgus, Georgia, and a swelling type bentonite clay (2.0 parts) obtained from the vicinity of the Black Hills in South Dakota were slurried with water (79.9 parts). The resulting slurry was heated to a temperature of about 195° F. A mixture of solid monoammonium phosphate and diammonium phosphate having a $P_2O_5$ to nitrogen weight ratio of 3:1 (42.9 parts), solid urea (34.8 parts), and solid potassium chloride (38.4 parts) were added to the slurry and stirred until dissolved, the temperature meanwhile being maintained at about 195° F. The slurry of the clay mixture in the solution of plant nutrients was allowed to stand undisturbed overnight in a closed container. This slurry fertilizer was designated as portion A.

For purposes of comparison, three additional batches of slurry fertilizer, designated as portions B, C, and D, respectively, were prepared in the same manner as portion A with the following exceptions:

Portion B: 4.0 parts of bentonite were added to the water and no attapulgite was added.

Portion C: 4.0 parts of attapulgite were added to the water and no bentonite was added.

Portion D: no attapulgite or bentonite was added to the water.

Portions B, C, and D were allowed to stand overnight in the same manner as portion A.

Each slurry was then poured onto a 20 mesh sieve, and solids, wet with the solution phase, retained on the screen were collected and weighed. The weight proportion of solids retained by the 20 mesh screen in each case was as follows:

| Portion | Additive | Proportion of Total Fertilizer Retained on 20 Mesh Sieve, percent |
|---|---|---|
| A | 1:1 mixture of attapulgite and bentonite | 0.1 |
| B | Bentonite | 2.9 |
| C | Attapulgite | 0.6 |
| D | None | 15.6 |

Thus, it can be seen that only an insignificant amount of coarse crystals (0.1%) is formed in the slurry when a mixture of attapulgite and bentonite was added. This amount is substantially less than the amount of crystals formed when either attapulgite or swelling bentonite were used alone as an additive to aqueous slurries of fertilizer materials.

Having thus fully described the instant invention, what is desired to be secured by Letters Patent is set forth in the following claims.

I claim:

1. A fertilizer in highly concentrated aqueous slurry form containing in excess of 30% by weight of a plant nutrient component selected from the group consisting of compounds of nitrogen, phosphate, potash and mixtures thereof, and a mixture, in an amount effective to inhibit the formation of large crystals and the settling of fine crystals in said slurry, of attapulgite and a swelling type bentonite in a weight ratio of between about 0.25 and about 4.0 parts of attapulgite per part of swelling type bentonite.

2. The fertilizer of claim 1 wherein the total weight of attapulgite and bentonite is between about 0.5 and about 6 percent of the slurry.

3. The fertilizer of claim 1 wherein the average particle size of said attapulgite and said bentonite is less than about 0.3 micron.

4. A fertilizer according to claim 1 wherein substantially all of the solid phase nutrient material has a particle size less than 20 mesh.

5. A mixed fertilizer containing in excess of 30% by weight of plant nutrient components consisting of compounds of nitrogen, phosphate and potash, said slurry containing attapulgite and a swelling type bentonite clay in a weight ratio of between about 0.25 and about 4 parts of attapulgite per part of swelling type bentonite, the total weight of attapulgite and bentonite comprising between about 0.5 and about 6 percent of said slurry, the solid phase nutrient material being in the form of finely divided particles in uniform suspension.

6. In the process of preparing a fertilizer in aqueous slurry form wherein compounds of plant nutrients selected from the group consisting of nitrogen, phosphate, potash, and mixtures thereof are dissolved in hot water in sufficient proportions to permit crystallization of a portion of said compounds when the resulting solution is cooled to room temperature, the improvement which comprises slurrying said solution, prior to cooling, with attapulgite and a swelling type bentonite clay in a weight ratio between about 0.25:1 and about 4:1, and cooling the resulting slurry to ambient temperature, whereby crystallization of a portion of plant nutrient compounds in finely divided form is effected.

7. The process of claim 6 wherein attapulgite and a swelling type bentonite clay are added in a proportion to provide between about 0.5 and about 6.0% by weight of said slurry.

8. A method for inhibiting the formation of large crystals and the settling of fine crystals in an aqueous slurry of fertilizer containing a plant nutrient component selected from the group consisting of compounds of nitrogen, phosphate, potash and mixtures thereof which comprises incorporating in said aqueous slurry a mixture of attapulgite and a swelling type bentonite clay in a weight ratio of between about 0.25 and about 4.0 parts of attapulgite per part of bentonite.

9. The method of claim 8 wherein the average particle size of said attapulgite and said bentonite is less than about 0.3 micron.

10. The method of claim 8 wherein the combined weight of attapulgite and bentonite incorporated is between about 0.5 and about 6% of the slurry.

References Cited in the file of this patent

UNITED STATES PATENTS

| | | |
|---|---|---|
| 847,749 | Ellis | Mar. 19, 1907 |
| 2,399,987 | Cordie et al. | May 7, 1946 |
| 2,498,480 | Bierlich et al. | Feb. 21, 1950 |
| 2,731,381 | Newcomer | Jan. 17, 1956 |
| 2,770,538 | Vierling | Nov. 13, 1956 |
| 2,971,292 | Malecki | Feb. 14, 1961 |